United States Patent [19]

Bottger

[11] Patent Number: 5,174,147
[45] Date of Patent: Dec. 29, 1992

[54] METHOD AND APPARATUS FOR COLD EXTRUDING UNIVERSAL SEAL CROSSPIECES

[75] Inventor: Guy H. Bottger, Ville Mont Royal, Canada

[73] Assignee: Masco Industries, Inc., Taylor, Mich.

[21] Appl. No.: 833,479

[22] Filed: Feb. 10, 1992

Related U.S. Application Data

[62] Division of Ser. No. 640,444, Jan. 11, 1991, Pat. No. 5,119,663.

[51] Int. Cl.⁵ .............................................. B21K 13/00
[52] U.S. Cl. .................................................. 72/353.2
[58] Field of Search ............. 72/306, 316, 323, 353.2, 72/354.8, 401

[56] References Cited

U.S. PATENT DOCUMENTS

| 469,784 | 3/1892 | Hall | 72/353.2 |
|---|---|---|---|
| 1,857,708 | 5/1932 | Benedetto | 72/353.2 |
| 3,096,579 | 7/1963 | Waller | 72/353.2 |
| 4,580,431 | 4/1986 | Oku et al. | 72/354.8 |

Primary Examiner—Lowell A. Larson
Attorney, Agent, or Firm—Edgar A. Zarins; Malcolm L. Sutherland

[57] ABSTRACT

A spider or cross for a universal joint is manufactured by first forging the basic configuration of the cross and thereafter extruding the trunnions into their final configuration. The component is initially hot or warm forged into its basic configuration including a central body and a plurality of trunnions. Thereafter, the trunnions are simultaneously extruded into their final configuration eliminating machining and a loss of materials. As a result, the grain flow of the component is not disrupted for a more reliable part.

4 Claims, 4 Drawing Sheets

METHOD AND APPARATUS FOR COLD EXTRUDING UNIVERSAL SEAL CROSSPIECES

This is a divisional of copending application Ser. No. 07/640,444 filed on Jan. 11, 1991, now U.S. Pat. No. 5,119,663 granted Jun. 9, 1992.

BACKGROUND OF THE INVENTION

I. Field of the Invention

This invention relates to a method and apparatus for forming crosspieces of a universal joint and, in particular, to a universal seal crosspiece having the rough form hot or warm forged and the trunnions extruded to their final form thereby maintaining the grain flow of the forged part.

II. Description of the Prior Art

Manufacturers are constantly seeking improved and less expensive methods of manufacturing spiders or crosses for universal joints used in automotive drive shafts. The strict requirements set by manufacturers of automatic transmissions for the automobile industry require the manufacturers of components to constantly improve the accuracy of the rough shapes for universal joint crosspieces or tripods. Traditionally, the spiders have been formed by a hot forging process. However, considerable machining and grinding was required to attain the necessary size, shape and surface finish of the trunnions. This machining resulted in a waste of material but also disrupted the grain flow of the part reducing the life of the part. Moreover, the additional machining steps increased the cost of manufacturing the part while resulting in a loss of raw material of up to 30%. In more recent times, attempts have been made to manufacture the crosses with less machining of the formed part. Complete extrusion of the spider in multipiece dies has been utilized in an attempt to reduce costs by eliminating machining. These parts are extruded from a cylindrical slug into a multi-piece die to form the trunnions of the spider. Extrusion of the complete spider limits the configuration of the part. Uniform surfaces and die volumes must be maintained since it is difficult to fill corners and remote portions of the die under the uniform material flow during extrusion. Cold extrusion requires that the hub of the crosspiece be symmetrical so as to allow full extrusion of the trunnions forming the crosspiece or tripod. Although additional machining and therefore waste of materials is eliminated, extrusion of the complete part is still more expensive than forging the component. Moreover, the grain flow of the extruded part is highly distorted although the grain is not interrupted.

SUMMARY OF THE PRESENT INVENTION

The present invention overcomes the disadvantages of the prior known processes for manufacturing spiders for universal joints by eliminating waste of material and maintaining the internal grin flow of component.

The cross or tripod of the universal joint comprises a main body with a plurality of trunnions which may be provided with lubrication holes in their ends. The configuration of the spider is formed by hot or warm forging. The trunnions are thereafter finished through cold extrusion to their desired shape. The lubrication holes are formed during extrusion of the trunnions. As a result, the trunnions are provided with the necessary size, shape and surface finish while maintaining the grain flow of the part. Further, by initially forging the part, greater variations in the configuration of the hub may be attained to meet specific requirements of individual manufacturers. The alignment of the trunnions is also improved through the method and apparatus of the present invention resulting in improved mechanical qualities of the overall assembly. The crosspieces obtained by this process do not require further tooling or shaping before final thermal treatment.

The universal joint cross is formed in a four piece die for extruding the individual trunnions. The forged cross is positioned within the die tool with the trunnions outwardly aligned with the extrusion dies. The extrusion dies are simultaneously brought together through hydraulic control in order to extrude all of the trunnions simultaneously thereby eliminating deformations of the cross. The extrusion dies have a smaller diameter than the forged trunnions causing the trunnions to be extruded outwardly into the die. To complete extrusion, a punch is extended into the trunnions to form the lube holes of each trunnion. Once extrusion is completed, the punch is removed and the dies are retracted leaving the finished trunnions.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

DETAILED DESCRIPTION OF A PREFERRED EMBODIMENT OF THE PRESENT INVENTION

Figure 1:
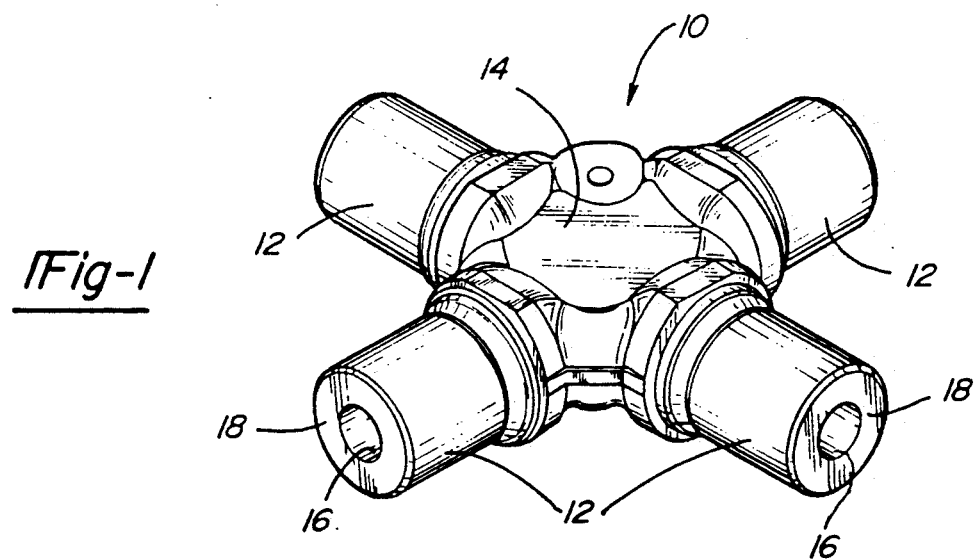
FIG. 1 is a perspective view of a universal joint cross embodying the present invention.
Figure 2:
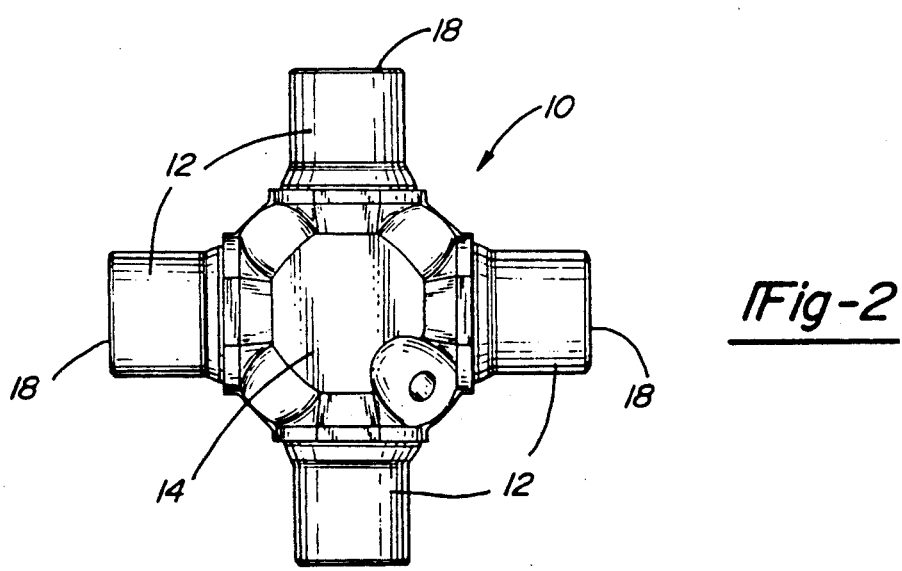
FIG. 2 is a side plan view thereof.
Figure 3:
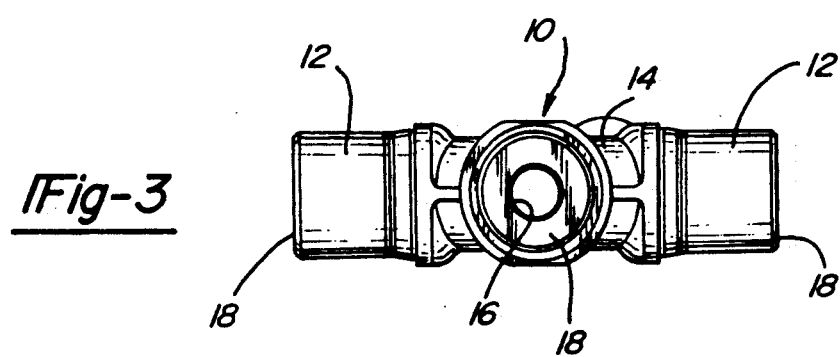
FIG. 3 is an end plan view thereof.

Referring first to FIGS. 1 through 3, there is shown an integral metal component exemplified by a spider 10 for a universal joint having four trunnions 12. The base configuration of the spider 10 is formed through warm or hot forging which has proven an economical and reliable method of manufacturing such parts. However, as opposed to the machining operations which are typically used to finish the trunnions 12 to the end specifications, the trunnions 12 of the present invention are extruded to their desired shape and finish. Extrusion of the trunnions 12 does not affect the central hub 14 of the spider 10 as it is only applied to the arms 12. As a result, the internal material grain flow formed during the forging process is uninterrupted as would be upon machining of the trunnions 12. In a preferred embodiment of the spider 10, four equally spaced trunnions 12 are integrally formed with the hub 14. However, similar crosses 10 have been formed with three arms 12. Moreover, in some applications the trunnions 12 are provided with lubrication holes 16 formed in the ends 18 thereof. Under the process of the present invention as will be described in greater detail, it is contemplated that the lube holes 16 can be formed during extrusion of the trunnion arms 12.

Figure 4:
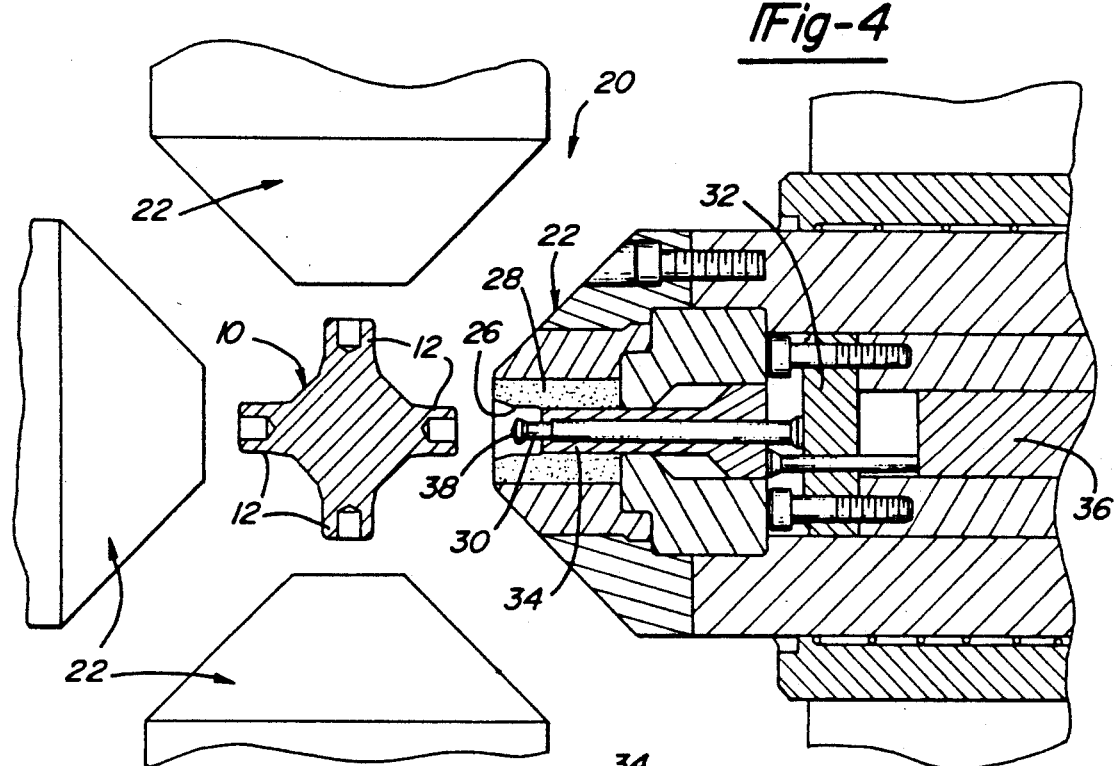
FIG. 4 is a partial cross-sectional perspective of a trunnion extrusion die for forming the universal joint cross.
Figure 5:
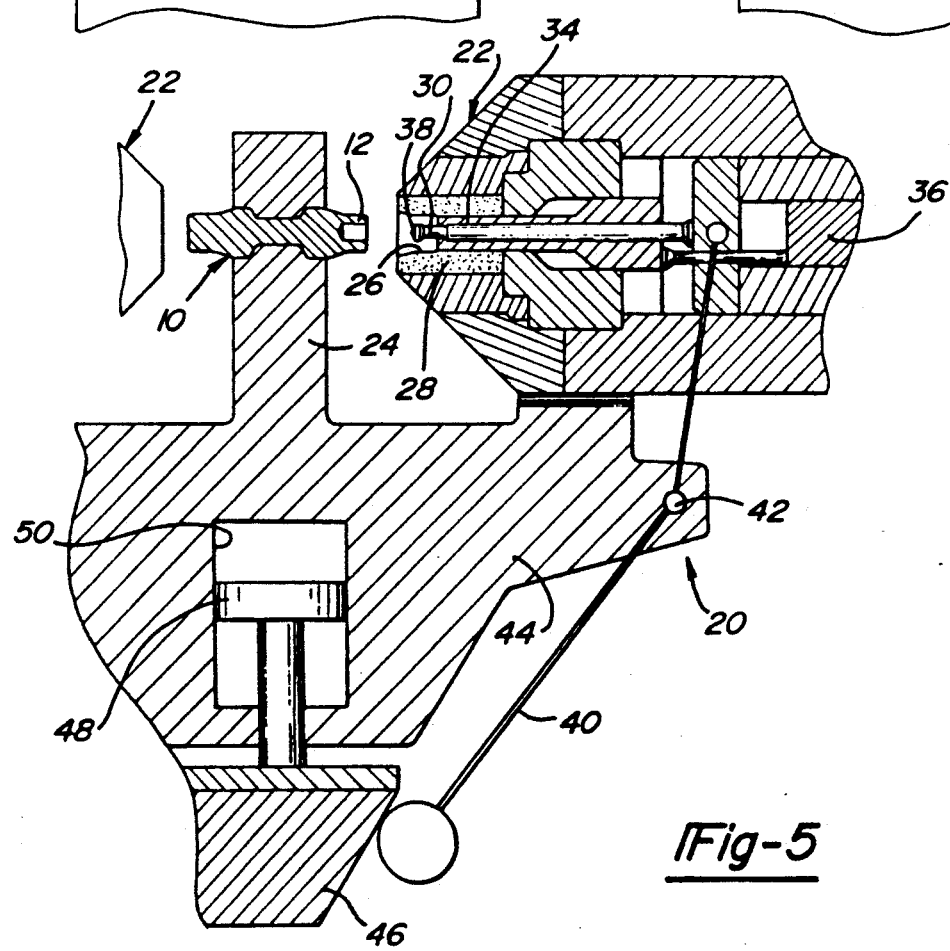
FIG. 5 is a side cross-sectional perspective of the trunnion extrusion die.

Referring now to FIGS. 4 and 5, there is shown an apparatus 20 for forming the finished trunnions 12 of the spider 10 from the forged base configuration. The apparatus 20 includes a plurality of identical die segments 22 corresponding to the number of arms 12 (i.e. crosspiece or tripod) which operate in unison to extrude the trunnions 12 to their end specifications. Extrusion of the trunnions 12 occurs simultaneously to balance the forces applied to the part 10 thereby preventing deformation. The apparatus 20 will be described in conjunction with one of the die segments 22 it being understood that each of the segments 22 operates identically and in unison. The die segments 22 operate on the spider 10 retained at the radial center of the segments 22 by a suitable clamping assembly 24. The segments 22 move radially inwardly and outwardly to extrude the trunnions 12 of the universal joint spider 10.

The individual die segments 22 include an internal cavity 26 corresponding to the desired finished shape of the trunnions 12. The cavity 26 is formed by a replaceable carbide die 28 suitable to extrude the forged arms 12 of the spider 10. Positioned within the cavity 26 is an axial punch 30 for selectively forming the lubrication holes 16 within the end 18 of the trunnion 12. The punch 30 is connected to a hydraulically controlled piston 32 for selectively moving the punch 30 between an extended and a retracted position. An ejector 34 is coaxially mounted with the punch 30 in the cavity 26. As with the punch 30 in the cavity 26. As with the punch 30, the ejector 34 is connected to a second piston 36 which hydraulically controls the movement of the ejector 34. The double hydraulic cylinder 32,36 operate in a well known manner to draw the pistons, and therefore the punch 30 and ejector 34, in and out of the cavity 26. In a preferred embodiment, the punch 30 has an enlarged nose 38 in order to extrude the lubrication holes 16 as the trunnions 12 are longitudinally extruded within the cavities 26.

Simultaneous movement of the die segments 22 is controlled by a cam and lever system as shown in FIG. 5. Each of the die segments 22 is connected to a pivotable lever 40 having a fulcrum point 42 fixedly connected to the base 44 of the apparatus 20. The other end of the lever 40 engages a movable cam 46 which is connected to a central piston 48 of a hydraulic control cylinder 50. The free end of each of the levers 40 associated with the die segments 22 engages the cam 46 such that upon movement of the central piston 48 and therefore the cam 46, the levers 40 will pivot At the fulcrum 42 resulting in corresponding movement of the die segments 22. Since each of the levers 40 and therefore the die segments 22 are connected to the cam 46, radial movement of the die segments 22 will occur simultaneously ensuring equal compression pressure on all sides of the spider 10. In a preferred embodiment shown in FIG. 5, as the wedge 46 moves upwardly the die segments 22 will be drawn outwardly. As a result, equal extrusion pressure is applied to all of the trunnions 12 of the spider 10.

Figure 6:
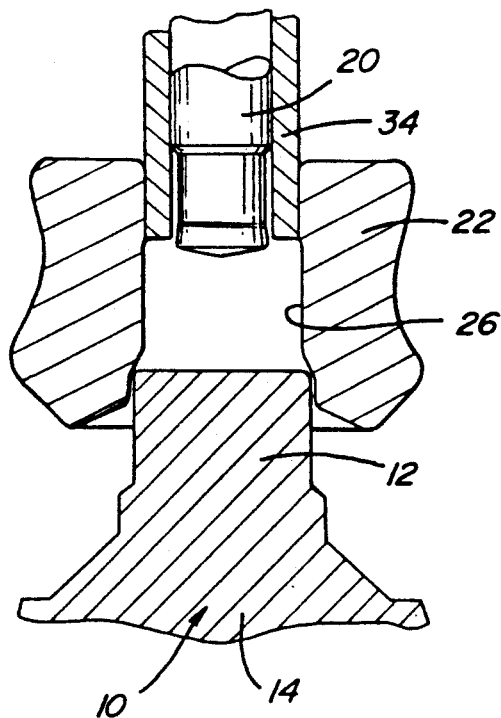
FIG. 6 is a cross-sectional view of the trunnion entering the extrusion die.
Figure 7:
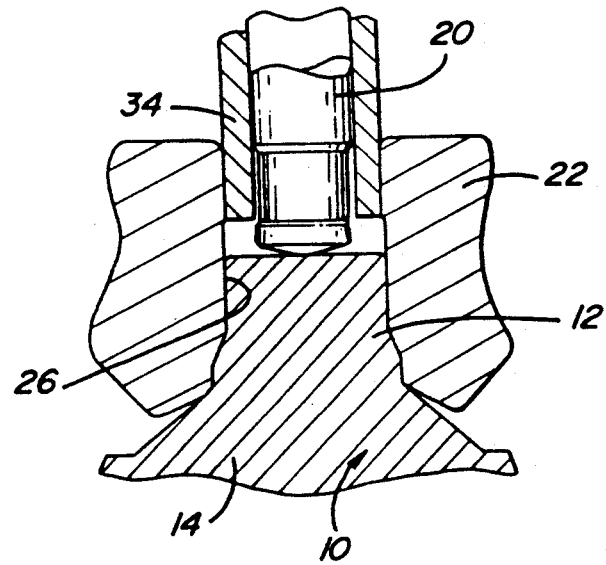
FIG. 7 is a cross-sectional view of the trunnion partially extruded within the die.
Figure 8:
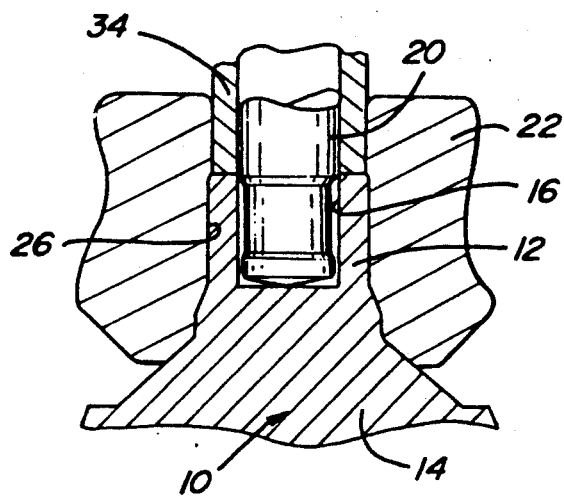
FIG. 8 is a cross-sectional view of the trunnion extruded and the lube hole formed by a retractable punch.
Figure 9:
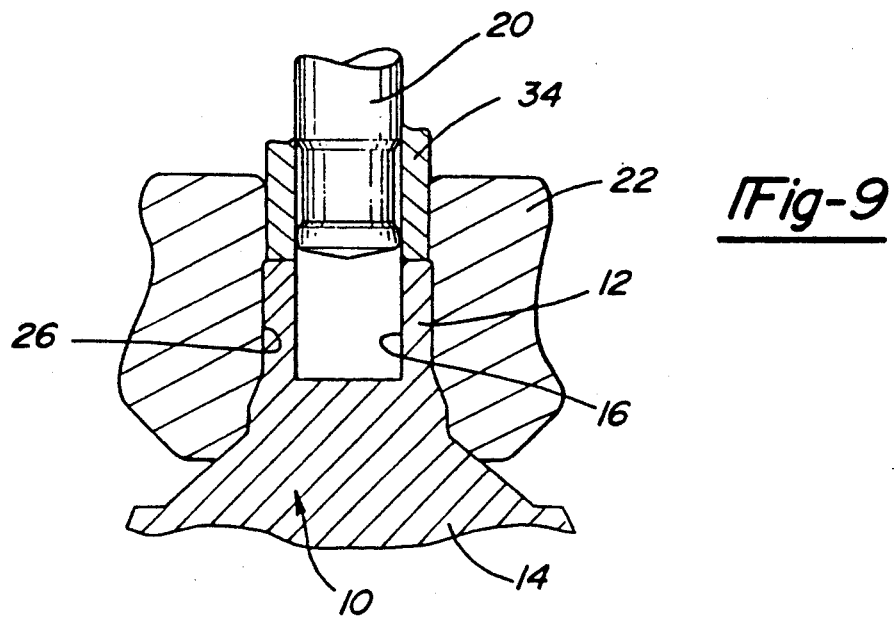
FIG. 9 is a cross-sectional view of the punch retracted from the die.
Figure 10:
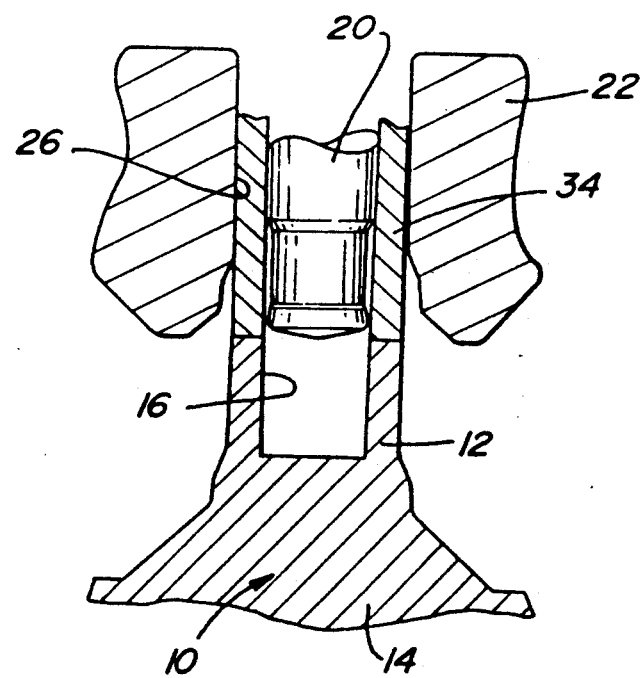
FIG. 10 is a cross-sectional view of the cross trunnion ejected from the die.

Referring now to FIG. 6 though 10 there is shown the process by which the trunnions 12 of the universal joint spider 10 are extruded to their end specifications from the forged base configuration. As a result, a spider 10 is formed with trunnions 12 having the required shape and finish smoothness without the loss of material or internal grain flow associated with typical machined trunnions. With the forged base configuration of the spider 10 positioned in the apparatus 10, the die segments 22 simultaneously move radially inwardly. As the cavity 26 engages the oversized protrusion 12 of the forged base (FIG. 6) the trunnion 12 will be longitudinally extruded into the cavity 26 (FIG. 7). Extrusion will continue until the die segments 22 have completed their radial inward movement with the die 28 engaging the vase of the trunnion 12 at the hub 14. As extrusion of the trunnion into the cavity 26 is completed, the axial punch 20 is extended into the cavity 26 and the end 18 of the trunnion 12 (FIG. 8). Extrusion of the lubrication holes 16 using the punch 20 completes the longitudinal extrusion of the trunnion 12 into the die cavity 26. With formation of the trunnions 12 completed, the punch 30 is withdrawn from the cavity 26 (FIG. 9). As the die segments 22 are retracted for release of the finished spider 10, the ejector 34 is used to push the trunnions 12 form the cavities 26 (FIG. 10). As a result, a forged spider 10 having a plurality of trunnions 12 extruded to their finished specification is formed using the process of the present invention. Costs of manufacturing are reduced by forging the base configuration and eliminating any loss of material from machining of the trunnions 12. Furthermore, manufacturing tolerances are maintained by simultaneously extruding all of the trunnions 12 resulting in a balancing of compression forces on the spider 10.

The foregoing detailed description has been given for clearness of understanding only and no unnecessary limitations should be understood therefrom as some modifications will be obvious to those skilled in the art without departing from the scope and spirit of the invention as defined in the appended claims.

What is claimed is:

1. A die apparatus for finishing a plurality of arms of an integrally forged metal component having a base configuration with a central body and said arms extending outwardly from said body, said die apparatus comprising:

a plurality of die segments corresponding to the number of arms of the components, each of said die segments including an internal cavity for longitudinally extruding the arms of the base configuration thereby maintaining the grain flow of the component, an axial punch selectively extendable axially into said cavity for extruding a lubrication hole in the ends of the arms, and an ejector pin coaxial with said axial punch to push the arms from said cavity upon extrusion of the arms of the base configuration to the desired finished shape;

said die segments simultaneously movable radially inwardly into compressive engagement with the arms of the base configuration to simultaneously extrude the arms to their finished shape thereby applying equal extrusion pressure on each arm of the component to prevent deformation of the component.

2. The die apparatus as defined in claim 1 wherein said die segments are hydraulically controlled for simultaneous extrusion of said arms and said axial punches and said ejectors are hydraulically controlled for simultaneous movement within each cavity of said die segments.

3. A die apparatus for finishing the arms of an integrally forged metal component having a base configuration with a central body and four arms extending outwardly from said body, said die apparatus comprising:
   four die segments radially spaced in alignment with the arms of the component, each of said die segments including an internal cavity for longitudinally extruding the arms of the base configuration thereby maintaining the grain flow of the component, an axial punch selectively extendable axially into said cavity for extruding a lubrication hole in the ends of the arms and an ejector pin coaxial with said axial punch to push the arms from said cavity upon extrusion of the arms of the base configuration to the desired finished shape;
   said die segments simultaneously movable radially inwardly into compressive engagement with the arms of the base configuration to simultaneously extrude the arms to their finished shape thereby applying equal extrusion pressure from four sides of the component on each arm thereof to prevent deformation of the component.

4. A die apparatus for finishing the arms of an integrally forged metal component having a base configuration with a central body and at least three radially spaced arms extending outwardly from said body, said die apparatus comprising:
   at least three die segments radially spaced in alignment with the arms of the component, each of said die segments including an internal cavity for longitudinally extruding the arms of the base configuration thereby maintaining the grain flow of the component, an axial punch selectively extendable axially into said cavity for extruding a hole in the ends of the arms, and an ejector pin coaxial with said axial punch to push the arms from said cavity upon extrusion of the arms of the base configuration to the desired finished shape;
   said at least three die segments simultaneously movable radially inwardly into compressive engagement with the arms of the base configuration to simultaneously extrude the arms to their finished shape thereby applying equal radial extrusion pressure on each arm of the component to prevent deformation of the component.

* * * * *